United States Patent
He et al.

(10) Patent No.: US 12,496,760 B2
(45) Date of Patent: Dec. 16, 2025

(54) CREEP-RESISTANT FIBER AND PREPARATION METHOD THEREOF

(71) Applicant: ZHEJIANG AEGIS NEW MATERIALS CO., LTD., Zhejiang (CN)

(72) Inventors: Fei He, Zhejiang (CN); Yang Li, Zhejiang (CN)

(73) Assignee: ZHEJIANG AEGIS NEW MATERIALS CO., LTD., Zhejiang (CN)

( * ) Notice: Subject to any disclaimer, the term of this patent is extended or adjusted under 35 U.S.C. 154(b) by 214 days.

(21) Appl. No.: 18/207,254

(22) Filed: Jun. 8, 2023

(65) Prior Publication Data

US 2023/0311397 A1    Oct. 5, 2023

Related U.S. Application Data

(63) Continuation of application No. PCT/CN2022/097700, filed on Jun. 8, 2022.

(30) Foreign Application Priority Data

Oct. 27, 2021  (CN) .......................... 202111253502.1

(51) Int. Cl.
| | |
|---|---|
| B29C 48/05 | (2019.01) |
| B29C 48/00 | (2019.01) |
| B29C 48/40 | (2019.01) |
| B29C 48/78 | (2019.01) |
| B29K 83/00 | (2006.01) |
| B29K 105/16 | (2006.01) |
| C08F 210/02 | (2006.01) |
| C08K 3/04 | (2006.01) |
| C08K 3/34 | (2006.01) |
| C08K 5/14 | (2006.01) |
| C08K 5/5425 | (2006.01) |
| C08L 43/04 | (2006.01) |

(52) U.S. Cl.
CPC .......... B29C 48/05 (2019.02); B29C 48/0018 (2019.02); B29C 48/022 (2019.02); B29C 48/40 (2019.02); B29C 48/78 (2019.02); C08F 210/02 (2013.01); C08K 3/042 (2017.05); C08K 3/34 (2013.01); C08K 5/14 (2013.01); C08K 5/5425 (2013.01); C08L 43/04 (2013.01); B29K 2083/00 (2013.01); B29K 2105/162 (2013.01); C08K 2201/011 (2013.01)

(58) Field of Classification Search
CPC .. D01F 6/04; D01F 11/06; C08K 3/02; C08K 3/34; C08K 5/14; C08K 5/5425; C08K 2201/011; B29C 48/06; B29C 48/345; B29C 48/92; B29C 48/022; B29C 48/768; B29C 48/919; B29C 48/78; B29C 48/0018; B29C 48/40; B29K 2105/162; B29K 2083/00; C08F 210/02; C08L 43/04

See application file for complete search history.

(56) References Cited

U.S. PATENT DOCUMENTS

2009/0123748 A1    5/2009    Braskem et al.

FOREIGN PATENT DOCUMENTS

| CN | 1749452 A | | 3/2006 |
|---|---|---|---|
| CN | 103993479 A | | 8/2014 |
| CN | 107973952 A | | 5/2018 |
| CN | 108004612 A | | 5/2018 |
| CN | 109824961 A | | 5/2019 |
| CN | 113026135 | * | 6/2021 |
| CN | 113862833 A | | 12/2021 |
| JP | 2004098635 A | | 4/2004 |

OTHER PUBLICATIONS

International Search Report of Corresponding Application PCT/CN2022/097700, mailed Aug. 29, 2022, 6 pages.
Wang, Xinpeng, "Study on the Preparation and Characterization of UHMWPE/EPOXY Resin Composite Fiber", Dong Hua University, Master Dissertation, Aug. 15, 2006; http://www.cnki.net; 79 Pgs with English abstract.
Yusong, Shao, "Preparation of Creep Resistant Ultra High Molecular Weight Polyethylene Fibers", Chinese Master's Theses Full-text Database, Engineering Science 1, Jun. 15, 2019, 75 Pgs with English abstract.
GB/T 19975-2005, "Test Method of Tensile Properties for High Tenacity Filament Yarn"; Nov. 4, 2005; 8 Pgs.

* cited by examiner

*Primary Examiner* — Camie S Thompson
(74) *Attorney, Agent, or Firm* — Cooper Legal Group, LLC

(57) ABSTRACT

The present application relates to the technical field of a macromolecular material, and particularly to a creep-resistant fiber and a preparation method thereof. The creep-resistant fiber includes the following components: ultra-high molecular weight polyethylene, epoxy resin, graphene, nano-silicon carbide and mica. The preparation method thereof is that: S1. preparing an ultra-high molecular weight polyethylene fiber spinning solution; S2. swelling and performing extrusion spinning to obtain a filament; S3. after spinning, passing the filament through a spinneret plate, and shock cooling in a cold water bath; S4. preparing a crosslinking modification solution; S5. conducting ultrasonic extraction; S6. drying and hot stretching to obtain a creep-resistant ultra-high molecular weight polyethylene fiber.

8 Claims, No Drawings

CREEP-RESISTANT FIBER AND PREPARATION METHOD THEREOF

CROSS-REFERENCE TO RELATED APPLICATION

This application is a continuation of PCT application serial no. PCT/CN2022/097700, filed on Jun. 8, 2022, which claims the priority and benefit of Chinese patent application serial no. 202111253502.1, filed on Oct. 27, 2021. The entireties of PCT application serial no. PCT/CN2022/097700 and Chinese patent application serial no. 202111253502.1 are hereby incorporated by reference herein and made a part of this specification.

TECHNICAL FIELD

The present application relates to the technical field of a macromolecular material, and particularly to a creep-resistant fiber and a preparation method thereof.

BACKGROUND ART

An ultra-high molecular weight polyethylene (UHMWPE) fiber, also known as a high-strength and high-modulus polyethylene fiber, is a high-performance fiber developed in 1970, having a white appearance, and is considered as three high-performance fibers that can realize industrial production together with an aromatic fiber and a carbon fiber. The ultra-high molecular weight polyethylene fiber has advantages such as high strength, high modulus, low density, good impact resistance, and good chemical corrosion resistance, and thus is widely used in a field of lightweight bulletproof helmet, soft bulletproof clothing, and the like.

In a related technology, a preparation method of the ultra-high molecular weight polyethylene fiber includes the following steps: preparing a spinning solution, adding an antioxidant, performing extrusion spinning by a twin-screw extruder, forming a gel filament in a cold water bath, extracting a solvent, drying, and hot stretching to obtain the ultra-high molecular weight polyethylene fiber.

In the above related technology, an ultra-high molecular weight polyethylene fiber molecule has a symmetric methylene structure and no side chain, and there is a small Van der Waals force and no hydrogen bond between fiber molecules. Therefore, there is a small intermolecular force between ultra-high molecular weight polyethylene fiber molecules, so that the ultra-high molecular weight polyethylene fiber is prone to creep under a stress.

SUMMARY

In order to address a problem that an ultra-high molecular weight polyethylene fiber is prone to creep, the present application provides a creep-resistant fiber and a preparation method thereof.

It is found that, adding a side branch chain to a backbone of the ultra-high molecular weight polyethylene fiber and introducing a group such as an ethyl, propyl, and the like can increase an intermolecular force between the ultra-high molecular weight polyethylene fiber molecules and further improve a creep resistance of the ultra-high molecular weight polyethylene fiber.

In a first aspect, a creep-resistant fiber is provided in the present application, adopting the following technical solution:

a creep-resistant fiber, including the following components: ultra-high molecular weight polyethylene, epoxy resin, graphene, nano-silicon carbide and mica.

In the above technical solution, when the ultra-high molecular weight polyethylene is filled and modified by graphene, nano-silicon carbide and mica, there is the intermolecular force between graphene, nano-silicon carbide, mica and the ultra-high molecular weight polyethylene fiber molecules, which can improve a heat resistance and a creep resistance of the ultra-high molecular weight polyethylene. In some embodiments, the ultra-high molecular weight polyethylene is a linear polyethylene without a branched chain, for example, having a molecular weight of 1.5 million or above. For example, it has a molecular formula of —(—$CH_2CH_2$—)-n-, a density of 0.920-0.964 g/cm$^3$, a hot deformation temperature of 0.46 MPa at 85° C. and a melting point of 130-136° C.

The epoxy resin is added as a matrix resin. On the one hand, it can promote mixing of graphene, nano-silicon carbide, mica and the ultra-high molecular weight polyethylene; and on the other hand, it serves as a nucleator, so that graphene, nano-silicon carbide, mica and the ultra-high molecular weight polyethylene, within the epoxy resin acting as a substrate, are dispersed along the epoxy resin and crystallized to form a microfiber structure in the system, which can further improves a processing stability of the ultra-high molecular weight polyethylene after filling modification.

Optionally, the creep-resistant fiber includes the following components by weight percentage: 88-92% of the ultra-high molecular weight polyethylene, 3-5% of epoxy resin, 1.5-3% of graphene, 1.5-2.5% of nano-silicon carbide and 0.5-1.5% of mica.

By adopting the above technical solution, on the one hand, the ultra-high molecular weight polyethylene fiber prepared by the components with above weight percentage ranges has good heat resistance and good creep resistance. When an addition amount of the epoxy resin is 3-5%, the epoxy resin has a good dispersivity in a filler, and, with the increase in a content of the epoxy resin, a mixing degree of the filler is gradually increased in this range. Presumably, the reason may be that, in the above range, with the increase in the addition amount of epoxy resin, there is more obvious microfiber phenomenon of a composite fiber, since the epoxy resin may serve as a nucleator to promote each component to mix with the ultra-high molecular weight polyethylene fiber, which improves the heat resistance and the creep resistance of modified ultra-high molecular weight polyethylene fiber to some extent.

On the other hand, when the addition amount of the epoxy resin is greater than 5%, a mechanical property of the modified ultra-high molecular weight polyethylene fiber is decrease to some extent during a test, especially and an obvious decrease when the addition amount of the epoxy resin is greater than 10%. Presumably, the reason may be that, when the addition amount of the epoxy resin is greater than a certain value, the epoxy resin may not be evenly dispersed due to agglomeration, therefore, after spinning, the modified ultra-high molecular weight polyethylene fiber is easy to be broken at a place where agglomeration occurs.

Optionally, the ultra-high molecular weight polyethylene is cross-linked with 3-(acrylyloxy) propyltrimethoxysilane through benzoyl peroxide.

In the above technical solution, the ultra-high molecular weight polyethylene is cross-linked, for example, by radiation grafting crosslinking, photocrosslinking, peroxide crosslinking, silane crosslinking modification or the like, by which a chemical structure of the ultra-high molecular weight polyethylene fiber molecule is directly changed. Comparing with a physical filling modification method, better effect and durability of performance can be obtained by the crosslinking modification.

Generally, a silane crosslinking modification includes heating the ultra-high molecular weight polyethylene containing peroxide and silane coupling agent, so that the peroxide is decomposed to produce free radicals which further captures hydrogen atoms in ultra-high molecular weight polyethylene molecules and generate new active free radicals. The active free radicals are subjected to a grafting reaction with silane to form a cross-linked network structure.

The benzoyl peroxide is decomposed to produce free radicals when being heated, which captures the hydrogen atoms in molecular chains of the ultra-high molecular weight polyethylene molecules to form ultra-high molecular weight polyethylene molecular free radicals. The ultra-high molecular weight polyethylene molecules are subjected to the grafting reaction with 3-(acrylyloxy) propyltrimethoxysilane, which grafts on the molecular chains of the ultra-high molecular weight polyethylene molecules, then are subjected to a hydrolytic reaction to form silanol. Two silanol are subjected to a dehydration condensation reaction, thereby forming a cross-linked network structure, and realizing a chemical crosslinking modification of the ultra-high molecular weight polyethylene molecules.

Presumably, it can be inferred that, a coordination between the physical filling modification and the chemical crosslinking modification in the present application can further improve and enhance the heat resistance and the creep resistance of the ultra-high molecular weight polyethylene fiber. Presumably, the reason may be that, some similar physical crosslinking points were produced between the ultra-high molecular weight polyethylene molecules due to the physical filling modification, which improves the intermolecular force between the ultra-high molecular weight polyethylene molecules. By the chemical crosslinking modification method, introducing the side brain chain to the molecule chain of the ultra-high molecular weight polyethylene and forming the cross-linked network structures between the ultra-high molecular weight polyethylene molecules through the dehydration condensation reaction can realize a structural modification in the ultra-high molecular weight polyethylene molecules. By improving the modes of action in or between the ultra-high molecular weight polyethylene molecules, an acquired effect by combination of the two modification methods is greater than that of either one.

Optionally, the addition amount of the benzoyl peroxide is 1-5 wt % of the ultra-high molecular weight polyethylene, and the addition amount of 3-(acrylyloxy) propyltrimethoxysilane is 10-20 wt % of the ultra-high molecular weight polyethylene.

By adopting the above technical solution, when the addition amount of the benzoyl peroxide as an initiator is 1-5 wt % of the ultra-high molecular weight polyethylene, the ultra-high molecular weight polyethylene can be better activated. An activated ultra-high molecular weight polyethylene has a good crosslinking degree with the 3-(acrylyloxy) propyltrimethoxysilane, which can reach over 80%.

When the addition amount of benzoyl peroxide is 5-10 wt % of the ultra-high molecular weight polyethylene, the crosslinking degree between the activated ultra-high molecular weight polyethylene and 3-(acrylyloxy) propyltrimethoxysilane is increased to some extent, but increase thereof by increasing the addition amount of benzoyl peroxide is relatively limited.

When the addition amount of the benzoyl peroxide is over 10 wt % of the ultra-high molecular weight polyethylene, the crosslinking degree between the activated ultra-high molecular weight polyethylene and 3-(acrylyloxy) propyltrimethoxysilane is not only not increased, but also decreased to some extent. Presumably, the reason may be that, when the addition amount of the benzoyl peroxide is greater than the certain value, the benzoyl peroxide is subjected to a crosslinking reaction, which affects an activated process of the ultra-high molecular weight polyethylene molecules.

When the addition amount of 3-(acrylyloxy) propyltrimethoxysilane as a silane coupling agent is 10-20 wt % of the ultra-high molecular weight polyethylene, a large number of 3-(acrylyloxy) propyltrimethoxysilane are grafted on the molecular chain of the ultra-high molecular weight polyethylene under an action of the benzoyl peroxide, which introduces an acryloyloxy on the molecular chain of the ultra-high molecular weight polyethylene. It can be found that, 3-(acrylyloxy) propyltrimethoxysilane as the silane coupling agent can further improve the creep resistance of the ultra-high molecular weight polyethylene after testing the performance of the ultra-high molecular weight polyethylene fiber.

Optionally, a mass ratio between benzoyl peroxide, 3-(acrylyloxy) propyltrimethoxysilane and the ultra-high molecular weight polyethylene is 1:3:20.

By adopting the above technical solution, when the mass ratio between benzoyl peroxide, 3-(acrylyloxy) propyltrimethoxysilane and the ultra-high molecular weight polyethylene is 1:3:20, that is, the addition amount of benzoyl peroxide is 5 wt % of the ultra-high molecular weight polyethylene and the addition amount of 3-(acrylyloxy) propyltrimethoxysilane is 15 wt % of the ultra-high molecular weight polyethylene, the ultra-high molecular weight polyethylene has best crosslinking modification effect which can reach up to 85%, and the modified ultra-high molecular weight polyethylene has the best creep resistance.

Optionally, the nano-silicon carbide is adsorption modified by vinyltrimethoxysilane.

Optionally, the addition amount of the vinyltrimethoxysilane is 30-50 wt % of the nano-silicon carbide.

In the above technical solution, the nano-silicon carbide has small particle size, large surface area and high surface energy, so that it is prone to agglomeration. Agglomeration is prone to affect the mixing degree of the nano-silicon carbide and the ultra-high molecular weight polyethylene, and finally affects the creep resistance of the ultra-high molecular weight polyethylene fiber.

When the addition amount of the vinyltrimethoxysilane is 30-50 wt % of the nano-silicon carbide, it is prone to be absorbed on a surface of the nano-silicon carbide, and the nano-silicon carbide can be better mixed in the filler.

After the nano-silicon carbide is adsorption modified by the vinyltrimethoxysilane, a mixing and combining degree of which in the filler can be further improved. Presumably, the reason may be that, after the vinyltrimethoxysilane is absorbed on the surface of the nano-silicon carbide, a methoxy thereof can react with a functional group such as —Si and —OH, and the like on the surface of the nano-silicon carbide to form chemical bonds, and a vinyl of the vinyltrimethoxysilane can be chemical crosslinking modified with the epoxy resin. Therefore, it promotes dispersion of the vinyltrimethoxysilane in the filler, decreases the possibility of the agglomeration of the nano-silicon carbide to a large extent, and further improves the creep resistance of the ultra-high molecular weight polyethylene after the physical filling modification.

In a second aspect, a preparation method of the creep-resistant fiber is provided in the present application, adopting the following technical solution:
a preparation method of the creep-resistant fiber, including the following process steps:
S1. adding the ultra-high molecular weight polyethylene, epoxy resin, graphene, nano-silicon carbide and mica in proportion to obtain an ultra-high molecular weight polyethylene fiber spinning solution;
S2. adding the ultra-high molecular weight polyethylene fiber spinning solution into a twin-screw extruder, swelling, and performing extrusion spinning to obtain a filament;
S3. after spinning, passing the filament through a spinneret plate, and shock cooling in a cold water bath to obtain an ultra-high molecular weight polyethylene gel filament;
S4. preparing a crosslinking modification solution in proportion, and adding to an extractant to obtain a mixed crosslinking modification solution;
S5. conducting ultrasonic extraction on the ultra-high molecular weight polyethylene gel filament through the mixed crosslinking modification solution; and
S6. drying and hot stretching to the ultra-high molecular weight polyethylene fiber to obtain the creep-resistant ultra-high molecular weight polyethylene fiber.

By adopting the above technical solution, comparing with a method of directly immersing the ultra-high molecular weight polyethylene fiber in the crosslinking solution dissolving with nano-silicon carbide and initiator and heat-treating, the method of adding the crosslinking modification solution into the initiator can improve the crosslinking degree between the ultra-high molecular weight polyethylene fiber and the nano-silicon carbide to some extent.

Optionally, a pretreatment process of the nano-silicon carbide in step S1 includes the following steps:
1) adding the nano-silicon carbide and the vinyltrimethoxysilane in proportion to toluene to premix;
2) stirring and conducting a temperature increasing reaction under a protection by injecting nitrogen; and
3) conducting vacuum filtration, ultrasonic dispersion, and centrifugal washing to a product obtained in step 2, and drying in an oven to obtain an adsorption modified nano-silicon carbide.

By adopting the above technical solution, the nano-silicon carbide is adsorption modified, which decreases the possibility of the agglomeration of the nano-silicon carbide during a mixing process.

Optionally, a mass fraction of the benzoyl peroxide in the mixed crosslinking modification solution is 3% in step S4.

In the above technical solution, when the mass fraction of the benzoyl peroxide in the mixed crosslinking modification solution is 3%, it can initiate a reaction during hot stretching of the ultra-high molecular weight polyethylene fiber and promote the crosslinking reaction between the 3-(acryly-loxy) propyltrimethoxysilane and the ultra-high molecular weight polyethylene molecule to form the cross-linked network structure, which improves the creep resistance of the ultra-high molecular weight polyethylene fiber.

In summary, the present application has the following beneficial effects:
1. in the present application, the ultra-high molecular weight polyethylene is modified by epoxy resin, graphene, nano-silicon carbide, mica, benzoyl peroxide and 3-(acryly-loxy) propyltrimethoxysilane, and there is a coordination between the physical filling modification and the chemical crosslinking modification, which can further improve and enhance the heat resistance and the creep resistance of the ultra-high molecular weight polyethylene fiber;
2. In the present application, when the ultra-high molecular weight polyethylene molecule is crosslinking modified by 5 wt % of benzoyl peroxide and 15 wt % of 3-(acrylyloxy) propyltrimethoxysilane, the ultra-high molecular weight polyethylene has the best crosslinking modification effect, the crosslinking degree can reach up to about 85%, and the modified ultra-high molecular weight polyethylene has the best creep resistance; and
3. In the present application, the nano-silicon carbide is adsorption modified by the vinyltrimethoxysilane. On the one hand, the methoxy of the vinyltrimethoxysilane can react with a functional group such as —Si and —OH, and the like on the surface of the nano-silicon carbide to form chemical bonds. On the other hand, the vinyl of the vinyltrimethoxysilane is chemical crosslinking modified with the epoxy resin, therefore, which can promote dispersion of the vinyltrimethoxysilane in the filler, decrease the possibility of the agglomeration of the nano-silicon carbide to a large extent, and further improve the creep resistance of the ultra-high molecular weight polyethylene after the physical filling modification.

DETAILED DESCRIPTION

The present application is further described in details below in combination with preparation examples, examples and comparative examples.

Performance parameters of raw materials used in preparation examples, examples and comparative examples of the present application are as follows:

| Raw materials | Performance parameters/Model | Manufacturer |
| --- | --- | --- |
| Ultra-high molecular weight polyethylene | Ultra-high molecular weight polyethylene power with an intrinsic viscosity number of 2800 mL/g | Ticona, Germany |
| Epoxy resin | Bisphenol A epoxy resin E44/6101 with an epoxy value of 0.45 | Commercially available |
| Graphene | Number is XF001W, Article number is 100001 | Jiangsu Xianfeng Nano Material Technology Co., Ltd |
| Nano-silicon carbide | Article number is XT-SIC -01 | Shanghai Xiangtian Nano Materials Co., Ltd |
| Mica | Product model is HY-TM1 | Shenzhen Haiyang Powder Technology Co., Ltd |

The ultra-high molecular weight polyethylene fiber in the present application was prepared through a gel-spinning process, basic process steps thereof were as follows:
1) dissolving the ultra-high molecular weight polyethylene in white oil as a solvent to obtain a spinning solution;
2) adding an ultra-high molecular weight polyethylene fiber spinning solution into a twin-screw extruder, swelling by heptane and performing extrusion spinning to obtain a filament;
3) after spinning, passing the filament through a spinneret plate, and shock cooling in a cold water bath to obtain an ultra-high molecular weight polyethylene gel filament;

4) conducting countercurrent extraction on the ultra-high molecular weight polyethylene gel filament by using dichloromethane as the extractant; and
5) drying and hot stretching to the ultra-high molecular weight polyethylene gel filament after step S4 to obtain an ultra-high molecular weight polyethylene fiber.

Preparation Examples of an Adsorption Modified Nano-Silicon Carbide

Preparation Example 1

The adsorption modified nano-silicon carbide was prepared from the following raw materials:
200 g of nano-silicon carbide and 60 g of vinyltrimethoxysilane.
The above adsorption modified nano-silicon carbide was prepared by the following process steps.
1200 mL of toluene was added into 2000 mL four-mouth flask, and 200 g of nano-silicon carbide and 60 g of vinyltrimethoxysilane were added into toluene in proportion. $N_2$ was injected into the four-mouth flask for protection. A mixing solution in the four-mouth flask was stirred at a stirring speed of 200 r/min, and then heated to 90° C. to allow an isothermal reaction for 3 h. After 3 h, a product was vacuum filtered when it was still hot, and then ultrasound (using water and acetone as media) dispersed for two times, in which each ultrasonic dispersion was controlled at 30 min. Then the product was centrifugally washed (using water and acetone as media), in which a rotation speed was controlled at 5000 r/min, and a centrifugal time was controlled at 30 min. The product was dried in an oven, in which a temperature of the oven was controlled at 120° C., and a drying time was controlled at 2 h, and then cooled to obtain the adsorption modified nano-silicon carbide.

Preparation Example 2

The Preparation example 2 differs from Preparation example 1 in that the addition amount of the vinyltrimethoxysilane was 80 g.

Preparation Example 3

The Preparation example 3 differs from Preparation example 1 in that the addition amount of the vinyltrimethoxysilane was 100 g.

Preparation Example 4

The Preparation example 4 differs from Preparation example 1 in that 60 g of vinyltrimethoxysilane and 200 g of nano-silicon carbide were added into 1000 mL of four-mouth flask, and the mixing solution in the four-mouth flask was stirred at the stirring speed of 200 r/min. The product was filtered and dried in the oven, in which the temperature of the oven was controlled at 65° C., and a dried time was controlled at 1.5 h, and then cooled to obtain the adsorption modified nano-silicon carbide.

EXAMPLES

Example 1

A creep-resistant fiber was prepared from the following raw materials:
880 g of ultra-high molecular weight polyethylene, 50 g of epoxy resin, 30 g of graphene, 25 g of nano-silicon carbide and 15 g of mica.
A preparation method of the creep-resistant fiber included the following process steps:
1) dissolving 880 g of the ultra-high molecular weight polyethylene powder, 50 g of epoxy resin, 30 g of graphene, 25 g of nano-silicon carbide and 15 g of mica in proportion in 1500 g of white oil as a solvent to obtain a spinning solution;
2) adding an ultra-high molecular weight polyethylene fiber spinning solution into the twin-screw extruder, swelling by heptane and performing extrusion spinning to obtain a filament;
3) after spinning, passing the filament through a spinneret plate, and shock cooling in a cold water bath to obtain an ultra-high molecular weight polyethylene gel filament;
4) conducting countercurrent extraction on the ultra-high molecular weight polyethylene gel filament by using 2000 g of dichloromethane as the extractant;
5) drying and hot stretching to the ultra-high molecular weight polyethylene gel filament after step S4 to obtain a creep-resistant fiber, that was, the creep-resistant ultra-high molecular weight polyethylene fiber.

Example 2

The Example 2 differs from Example 1 in that, the raw materials prepared the creep-resistant fiber were as follows:
920 g of an ultra-high molecular weight polyethylene powder, 30 g of epoxy resin, 20 g of graphene, 20 g of nano-silicon carbide and 10 g of mica.

Example 3

The Example 3 differs from Example 1 in that, the raw materials prepared the creep-resistant fiber were as follows:
800 g of an ultra-high molecular weight polyethylene powder, 130 g of epoxy resin, 30 g of graphene, 25 g of nano-silicon carbide and 15 g of mica.

Example 4

The Example 4 differs from Example 1 in that, the raw materials prepared the creep-resistant fiber were as follows:
920 g of an ultra-high molecular weight polyethylene powder, 10 g of epoxy resin, 30 g of graphene, 25 g of nano-silicon carbide and 15 g of mica.

Example 5

The Example 5 differs from Example 1 in that, the nano-silicon carbide was the adsorption modified nano-silicon carbide prepared in Preparation example 1.

Example 6

The Example 6 differs from Example 1 in that, the nano-silicon carbide was the adsorption modified nano-silicon carbide prepared in Preparation example 2.

Example 7

The Example 7 differs from Example 1 in that, the nano-silicon carbide was the adsorption modified nano-silicon carbide prepared in Preparation example 3.

Example 8

The Example 8 differs from Example 1 in that, the nano-silicon carbide was the adsorption modified nano-silicon carbide prepared in Preparation example 4.

Example 9

The Example 9 differs from Example 7 in that, the raw materials prepared the creep-resistant fiber were as follows:
880 g of an ultra-high molecular weight polyethylene powder, 50 g of epoxy resin, 30 g of graphene, 25 g of nano-silicon carbide and 15 g of mica, 8.8 g of benzoyl peroxide and 88 g of 3-(acrylyloxy) propyltrimethoxysilane.

The preparation method of the creep-resistant fiber included the following process steps:
1) dissolving the 880 g of the ultra-high molecular weight polyethylene powder, 50 g of epoxy resin, 30 g of graphene, 25 g of nano-silicon carbide and 15 g of mica in proportion in 1500 g of white oil as the solvent to obtain the spinning solution;
2) adding the ultra-high molecular weight polyethylene fiber spinning solution into the twin-screw extruder, swelling by the heptane and performing extrusion spinning to obtain a filament;
3) after spinning, passing the filament through the spinneret plate, and shock cooling in the cold water bath to obtain an ultra-high molecular weight polyethylene gel filament;
4) conducting countercurrent extraction on the ultra-high molecular weight polyethylene gel filament by using 2000 g of dichloromethane as the extractant;
5) drying and hot stretching to the ultra-high molecular weight polyethylene gel filament after step S4 to obtain a crude product;
6) preparing the crosslinking solution by 8 g of benzoyl peroxide and 80 g of 3-(acrylyloxy) propyltrimethoxysilane in proportion, immersing the crude product in the crosslinking solution and controlling the immersing time at 2 h; and
7) drying and hot stretching to the crude product in step S6 to obtain the creep-resistant fiber.

Example 10

The Example 10 differs from Example 9 in that, the preparation method of the creep-resistant fiber included the following process steps:
1) dissolving the 880 g of the ultra-high molecular weight polyethylene powder, 50 g of epoxy resin, 30 g of graphene, 25 g of nano-silicon carbide and 15 g of mica in proportion in 1500 g of white oil as the solvent to obtain the ultra-high molecular weight polyethylene fiber spinning solution;
2) adding the ultra-high molecular weight polyethylene fiber spinning solution into the twin-screw extruder, swelling by the heptane and performing extrusion spinning to obtain a filament;
3) after spinning, passing the filament through the spinneret plate, and shock cooling in the cold water bath to obtain an ultra-high molecular weight polyethylene gel filament;
4) adding 8.8 g of benzoyl peroxide and 88 g of 3-(acrylyloxy) propyltrimethoxysilane in proportion into 200 g of dichloromethane to prepare the mixed crosslinking modification solution, and conducting ultrasonic countercurrent extraction to the ultra-high molecular weight polyethylene gel filament by the mixed crosslinking modification solution; and
5) drying and hot stretching to the ultra-high molecular weight polyethylene gel filament after step S4 to obtain the creep-resistant fiber, that was, the creep-resistant ultra-high molecular weight polyethylene fiber.

Example 11

The Example 11 differs from Example 10 in that, the addition amount of benzoyl peroxide was 44 g, and the addition amount of 3-(acrylyloxy) propyltrimethoxysilane was 132 g.

Example 12

The Example 12 differs from Example 11 in that, the addition amount of 3-(acrylyloxy) propyltrimethoxysilane was 176 g.

Example 13

The Example 13 differs from Example 11 in that, the addition amount of benzoyl peroxide was 88 g.

Example 14

The Example 14 differs from Example 11 in that, the addition amount of dichloromethane was 1300 g.

Example 15

The Example 15 differs from Example 11 in that, the addition amount of dichloromethane was 2000 g.

COMPARATIVE EXAMPLES

Comparative Example 1

The Comparative example 1 differs from Example 1 in that, the 1000 g of the ultra-high molecular weight polyethylene powder in proportion was dissolved in 1500 g of white oil as the solvent to obtain the spinning solution in step S1.

Comparative Example 2

The Comparative example 2 differs from Example 1 in that, the epoxy resin was replaced by equivalent ultra-high molecular weight polyethylene powder in step S1.

Comparative Example 3

The Comparative example 3 differs from Example 1 in that, the graphene, nano-silicon carbide and mica were replaced by equivalent ultra-high molecular weight polyethylene powder in step S1.

Performance Test

Testing the products of Examples 1-14 and the Comparative examples 1-3 according to "GB/T 19975-2005 of Test Method of Tensile Properties for High Tenacity Filament Yarn", and separately calculating mean breaking strength and tensile creep elongation of Examples 1-14 and the Comparative examples 1-3.

In particular, calculated formula of the tensile creep elongation is $$G = \left[\frac{l_1 - l_0}{l_0}\right] \times 100\%,$$

wherein:

G is the tensile creep elongation, %; $l_0$ is a primary length, in millimeters (mm); $l_1$ is a length of test sample after applying a heavy load or a finial breaking length, in millimeters (mm).

Test results were as the follow table

| Groups | Performance parameters | |
|---|---|---|
| | Mean breaking strength/(cN/dtex) | Tensile creep elongation/% |
| Example 1 | 19.47 | 4.12 |
| Example 2 | 18.24 | 4.84 |
| Example 3 | 14.58 | 4.18 |
| Example 4 | 16.62 | 5.24 |
| Example 5 | 19.42 | 3.28 |
| Example 6 | 19.45 | 2.94 |
| Example 7 | 19.40 | 2.78 |
| Example 8 | 19.49 | 3.87 |
| Example 9 | 19.46 | 2.12 |
| Example 10 | 19.39 | 1.25 |
| Example 11 | 19.45 | 0.83 |
| Example 12 | 19.51 | 0.94 |
| Example 13 | 19.54 | 1.22 |
| Example 14 | 19.48 | 0.78 |
| Example 15 | 19.47 | 1.22 |
| Comparative example 1 | 16.45 | 14.23 |
| Comparative example 2 | 16.66 | 10.23 |
| Comparative example 3 | 16.42 | 14.18 |

It can be seen from Examples 1-4 and Comparative examples 1-3 that, the ultra-high molecular weight polyethylene was filling modified by graphene, nano-silicon carbide and mica, which can improves breaking strength and creep resistance of the ultra-high molecular weight polyethylene fiber obviously.

When the addition amount of the epoxy resin was 3-5%, adding epoxy resin can further enhance breaking strength and creep resistance of the ultra-high molecular weight polyethylene fiber. Presumably, the reason may be that, in the above range, with the increase in the addition amount of epoxy resin, there is more obvious microfiber phenomenon of a composite fiber, since the epoxy resin may serve as a nucleator to promote each component to mix with the ultra-high molecular weight polyethylene fiber, which improved the heat resistance and the creep resistance of modified ultra-high molecular weight polyethylene fiber to some extent.

when the addition amount of the epoxy resin was greater than 5%, a mechanical property of a modified ultra-high molecular weight polyethylene fiber was decrease to some extent during a test, especially and an obvious decrease when the addition amount of the epoxy resin was greater than 10%. Presumably, the reason may be that, when the addition amount of the epoxy resin was greater than a certain value, the epoxy resin may not be evenly dispersed due to agglomeration, therefore, after spinning, the modified ultra-high molecular weight polyethylene fiber was easy to be broken at a place where agglomeration occurs.

It can be seen from Example 1 and Examples 5-8 that, the nano-silicon carbide was adsorption modified by the vinyltrimethoxysilane, which can further improve the creep resistance of the ultra-high molecular weight polyethylene fiber.

It can be seen from Example 1, Examples 5-8 and Examples 9-12 that, the ultra-high molecular weight polyethylene was conducted chemical crosslinking modification by the benzoyl peroxide and 3-(acrylyloxy) propyltrimethoxysilane, which can further improve the creep resistance of the ultra-high molecular weight polyethylene fiber. Presumably, the reason may lie in that, some similar physical crosslinking points were produced between the ultra-high molecular weight polyethylene molecules due to the physical filling modification, which improves intermolecular force between the ultra-high molecular weight polyethylene molecules; and, the side brain chain was added to the molecule chain of the ultra-high molecular weight polyethylene through the chemical crosslinking modification method, and a cross-linked network structure was formed between the ultra-high molecular weight polyethylene molecules through the dehydration condensation reaction, which realizes a structural modification in the ultra-high molecular weight polyethylene molecules. The modes of action in or between the ultra-high molecular weight polyethylene molecules were improved, so that an acquired effect by combination of the two modification methods was greater than that of either one.

It can be seen from Examples 10-15 that, when the mass fraction of the benzoyl peroxide in the mixed crosslinking modification solution was 3%, it can initiate a reaction during hot stretching of the ultra-high molecular weight polyethylene fiber, and promote the crosslinking reaction between the 3-(acrylyloxy) propyltrimethoxysilane and the ultra-high molecular weight polyethylene molecule to form the cross-linked network structure, which improves the creep resistance of the ultra-high molecular weight polyethylene fiber. However, increasing the addition amount of the benzoyl peroxide can further improve the creep resistance of the ultra-high molecular weight polyethylene fiber.

The above are the preferred embodiments of the present application, which are not intended to limit the protection scope of the present application. Therefore, all equivalent changes made according to the structure, shape and principle of the present application should be covered within the protection scope of the present application.

What is claimed is:

1. A creep-resistant fiber comprising the following components: ultra-high molecular weight polyethylene, epoxy resin, graphene, nano-silicon carbide and mica;
   wherein the ultra-high molecular weight polyethylene has a cross-linked network structure after being modified by benzoyl peroxide and 3-(acrylyloxy) propyltrimethoxysilane;
   wherein a surface of the nano-silicon carbide is adsorbed with vinyltrimethoxysilane.

2. The creep-resistant fiber according to claim 1, comprising the following components by weight percentage: 88-92% of the ultra-high molecular weight polyethylene, 3-5% of the epoxy resin, 1.5-3% of the graphene, 1.5-2.5% of the nano-silicon carbide and 0.5-1.5% of the mica.

3. The creep-resistant fiber according to claim 1, wherein an amount of the benzoyl peroxide is 1-5 wt % of the ultra-high molecular weight polyethylene, and an amount of the 3-(acrylyloxy) propyltrimethoxysilane is 10-20 wt % of the ultra-high molecular weight polyethylene.

4. The creep-resistant fiber according to claim 3, wherein a mass ratio between the benzoyl peroxide, the 3-(acrylyloxy) propyltrimethoxysilane and the ultra-high molecular weight polyethylene is 1:3:20.

5. The creep-resistant fiber according to claim 1, wherein an amount of the vinyltrimethoxysilane is 30-50 wt % of the nano-silicon carbide.

6. A preparation method of the creep-resistant fiber according to claim 5 comprising the following process steps:
- S1. adding the ultra-high molecular weight polyethylene, the epoxy resin, the graphene, the nano-silicon carbide and the mica to obtain an ultra-high molecular weight polyethylene fiber spinning solution;
- S2. adding the ultra-high molecular weight polyethylene fiber spinning solution into a twin-screw extruder, swelling and performing extrusion spinning to obtain a filament;
- S3. after spinning, passing the filament through a spinneret plate, and shock cooling in a cold water bath to obtain an ultra-high molecular weight polyethylene gel filament;
- S4. preparing a crosslinking modification solution, and adding to an extractant to obtain a mixed crosslinking modification solution;
- S5. conducting ultrasonic extraction on the ultra-high molecular weight polyethylene gel filament through the mixed crosslinking modification solution; and
- S6. drying and hot stretching the ultra-high molecular weight polyethylene fiber to obtain the creep-resistant fiber.

7. The preparation method of the creep-resistant fiber according to claim 6, wherein a pretreatment process of the nano-silicon carbide in step S1 comprises the following steps:
1) Adding the nano-silicon carbide and the vinyltrimethoxysilane to toluene to premix;
2) Stirring and conducting a temperature increasing reaction under a protection of nitrogen; and
3) conducting vacuum filtration, ultrasonic dispersion, and centrifugal washing to a product obtained in step 2, and drying in an oven to obtain an adsorption modified nano-silicon carbide.

8. The preparation method of the creep-resistant fiber according to claim 6, wherein a mass fraction of the benzoyl peroxide in the mixed crosslinking modification solution is 3% in step S4.

* * * * *